United States Patent
Lee et al.

(10) Patent No.: US 8,620,147 B2
(45) Date of Patent: Dec. 31, 2013

(54) METHOD AND APPARATUS FOR TRANSMITTING COMPRESSED DATA USING DIGITAL DATA INTERFACE, AND METHOD AND APPARATUS FOR RECEIVING COMPRESSED DATA USING DIGITAL DATA INTERFACE

(75) Inventors: Jae-jun Lee, Suwon-si (KR); Jae-seung Kim, Yongin-si (KR); Seong-sin Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 12/697,710

(22) Filed: Feb. 1, 2010

(65) Prior Publication Data

US 2010/0247059 A1 Sep. 30, 2010

Related U.S. Application Data

(60) Provisional application No. 61/165,029, filed on Mar. 31, 2009, provisional application No. 61/165,624, filed on Apr. 1, 2009.

(30) Foreign Application Priority Data

May 20, 2009 (KR) .................. 10-2009-0044136

(51) Int. Cl.
 *H04N 5/92* (2006.01)
(52) U.S. Cl.
 USPC ........................................... 386/326
(58) Field of Classification Search
 None
 See application file for complete search history.

(56) References Cited

U.S. PATENT DOCUMENTS

2004/0032488 A1* 2/2004 Harman ................ 348/51
2009/0167930 A1* 7/2009 Safaee-Rad et al. ......... 348/347

* cited by examiner

*Primary Examiner* — William C Vaughn, Jr.
*Assistant Examiner* — Daniel Tekle
(74) *Attorney, Agent, or Firm* — Sughrue Mion, PLLC

(57) ABSTRACT

A method of receiving media data capable of being transceived via a digital data interface is provided. In the method, media data is received and parsed, and ancillary data for raw data and compression-related information about compressed data for the raw data are extracted from an ancillary data field of the parsed media data. The compressed data is extracted from the parsed media data, and the compressed data is decoded using the compression-related information so as to restore the raw data. The restored raw data is played back using the ancillary data and the compression-related information.

33 Claims, 10 Drawing Sheets

FIG. 8

| | | | | | | | | | |
|---|---|---|---|---|---|---|---|---|---|
| 810 — InfoFrame Type Code | InfoFrame Type = 05₁₆ | | | | | | | | |
| 815 — InfoFrame Version Number | Version = 01₁₆ | | | | | | | | |
| 820 — Length of MPEG Source InfoFrame | Length of MPEG Source InfoFrame (10) | | | | | | | | |
| 825 — Data Byte 1 | MB#0 (MPEG Bit Rate: Hz Lower → Upper) | | | | | | | | |
| 830 — Data Byte 2 | MB#1 | | | | | | | | |
| 835 — Data Byte 3 | MB#2 | | | | | | | | |
| 840 — Data Byte 4 | MB#3 | | | | | | | | |
| 845 — Data Byte 5 | F57=0 | F56=0 | F55=0 | FR0 | F53=0 | F52=0 | MF1 | MF0 |
| 850 — Data Byte 6 | F67=0 | F66=0 | F65=0 | F64=0 | F63=0 | F62=0 | F61=0 | F60=0 |
| 855 — Data Byte 7 | F77=0 | F76=0 | F75=0 | F74=0 | F73=0 | F72=0 | F71=0 | F70=0 |
| 860 — Data Byte 8 | F87=0 | F86=0 | F85=0 | F84=0 | F83=0 | F82=0 | F81=0 | F80=0 |
| 865 — Data Byte 9 | F97=0 | F96=0 | F95=0 | F94=0 | F93=0 | F92=0 | F91=0 | F90=0 |
| 870 — Data Byte 10 | F107=0 | F106=0 | F105=0 | F104=0 | F103=0 | F102=0 | F101=0 | F100=0 |

| | | |
|---|---|---|
| 910 | InfoFrame Type Code | 06h |
| 915 | InfoFrame Version Number | VERSION NUMBER |
| 920 | Length of InfoFrame | LENGTH OF COMPRESSED DATA |
| 925 | Data Byte 1 | BR#0 - BITRATE |
| 930 | Data Byte 2 | BR#1 - BITRATE |
| 935 | Data Byte 3 | BR#2 - BITRATE |
| 940 | Data Byte 4 | BR#3 - BITRATE |
| 945 | Data Byte 5 | ES/TS, CONTAINER |
| 950 | Data Byte 6 | TYPE OF VIDEO CODEC |
| 955 | Data Byte 7 | RESOLUTION |
| 960 | Data Byte 8 | 3D IMAGE RELATED INFORMATION |
| 965 | Data Byte 9 | |
| 970 | Data Byte 10 | |

| | | |
|---|---|---|
| 1010 | Data Byte 1 | TAG CODE, LENGTH OF COMPRESSED DATA BLOCK |
| 1015 | Data Byte 2 | EXTENDED TAG CODE |
| 1020 | Data Byte 3 | BR#0-BITRATE |
| 1025 | Data Byte 4 | BR#1 - BITRATE |
| 1030 | Data Byte 5 | BR#2 - BITRATE |
| 1035 | Data Byte 6 | BR#3 - BITRATE |
| 1040 | Data Byte 7 | ES/TS, BITRATE |
| 1045 | Data Byte 8 | TYPE OF VIDEO CODEC |
| 1050 | Data Byte 9 | RESOLUTION |
| 1055 | Data Byte 10 | 3D IMAGE RELATED INFORMATION |

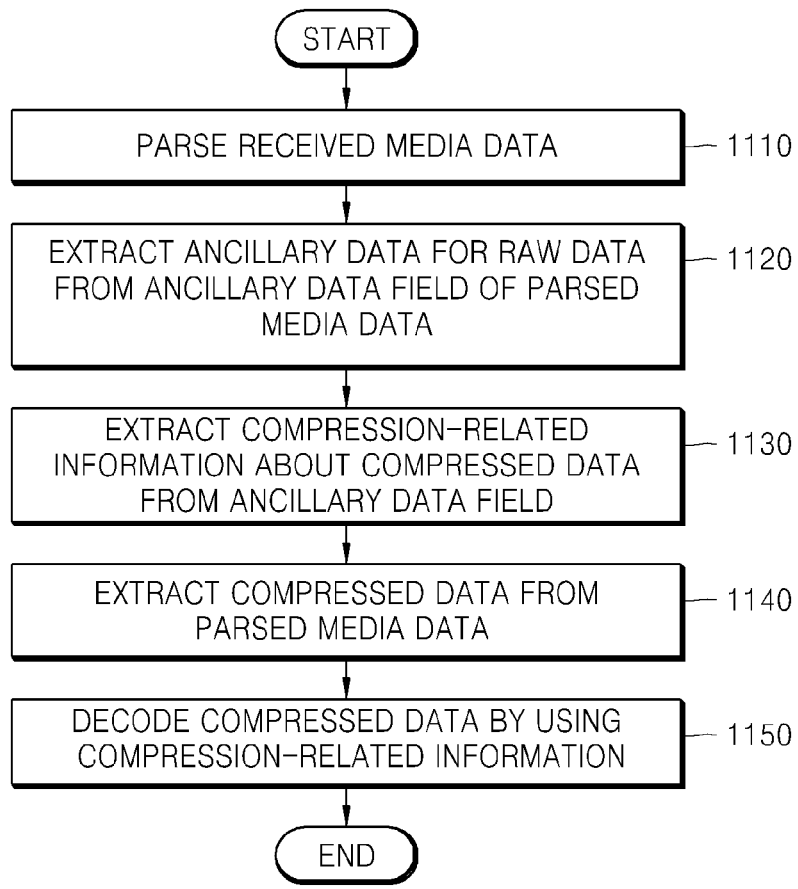

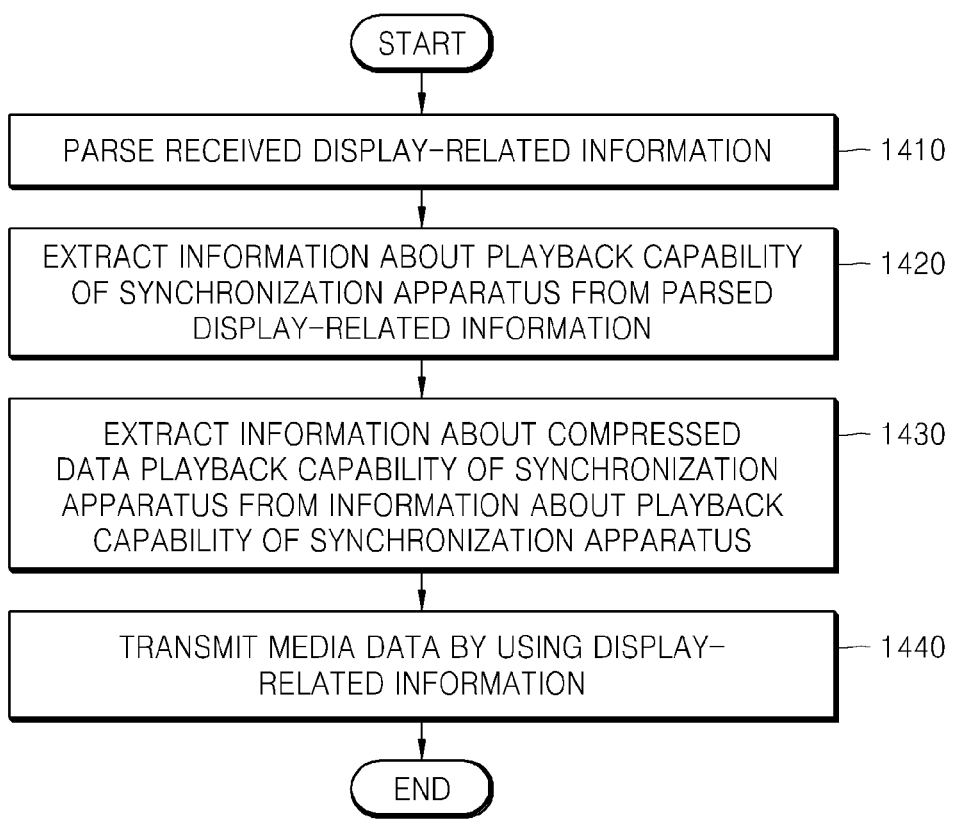

METHOD AND APPARATUS FOR TRANSMITTING COMPRESSED DATA USING DIGITAL DATA INTERFACE, AND METHOD AND APPARATUS FOR RECEIVING COMPRESSED DATA USING DIGITAL DATA INTERFACE

CROSS-REFERENCE TO RELATED PATENT APPLICATION

This application claims priority from U.S. Provisional Patent Application No. 61/165,029, filed on Mar. 31, 2009, and U.S. Provisional Patent Application No. 61/165,624, filed on Apr. 1, 2009, in the U.S. Patent and Trademark Office, and the benefit of Korean Patent Application No. 10-2009-0044136, filed on May 20, 2009, in the Korean Intellectual Property Office, the disclosures of which are incorporated herein in their entirety by reference.

BACKGROUND OF THE INVENTION

1. Field of the Invention

Exemplary embodiments consistent with the present invention relate to communication of high-resolution image data through a digital data interface.

2. Description of the Related Art

As demand for a photographing system that captures high-resolution video images or high-quality video images and a playback system that plays back the high-resolution video images or high-quality video images increases, a communication environment that allows high-resolution video images or high-quality video images to be transmitted and received is increasingly attracting attention.

Since three-dimensional (3D) images have a greater amount of data than general single-view images, communication of 3D images requires an environment that enables communication of large-capacity data.

SUMMARY OF THE INVENTION

Exemplary embodiments of the present invention provide transmission and reception of media data and display-related information via a digital data interface.

According to an aspect of the present invention, there is provided a method of receiving media data via a digital data interface of a synchronization apparatus, the method including parsing received media data; extracting compression-related information about compressed data obtained by compressing raw data, from an ancillary data field of the parsed media data, wherein ancillary data for the raw data has been inserted into the ancillary data field; extracting the compressed data from the parsed media data; and decoding the compressed data by using the compression-related information.

The method may further include extracting the ancillary data from the ancillary data field; and playing back the raw data restored by decoding the compressed data, by using at least one selected from the group consisting of the ancillary data and the compression-related information.

According to another aspect of the present invention, there is provided a method of transmitting media data from a source apparatus to a synchronization apparatus via a digital data interface of the synchronization apparatus, the method including forming a media data structure into which compressed data obtained by compressing raw data; inserting ancillary data for the raw data into an ancillary data field included in the media data structure; and inserting compression-related information about the compressed data into the ancillary data field of the media data structure.

The method may further include transmitting the media data from the source apparatus to the synchronization apparatus via the digital data interface.

The media data structure is a data structure capable of being transceived via the digital data interface.

The compression-related information may include at least one selected from the group consisting of information about whether the compressed data is included in the media data, information about a bitrate of the compressed data, information about the type of a data stream of the compressed data, information about a compression method of the compressed data, information about a resolution of the compressed data, and information about three-dimensional (3D) image compressed data.

The compression-related information may be inserted into a compression-related field or a reserved field of an existing ancillary data frame inserted into the data structure of the media data. The compression-related information may be inserted into a new ancillary data frame. The new ancillary data frame may be inserted into the ancillary data field.

The ancillary data field may be at least one selected from the group consisting of a vertical blanking interval (VBI) field and a horizontal blanking interval (HBI) field of the data structure of the media data.

The compressed data may be inserted into at least one selected from the group consisting of the VBI field, the HBI field, and an active video space of the data structure of the media data.

According to a data transmission speed, data pieces for respective color components of the compressed data may be transmitted via a single data line or via data lines for the respective color components.

According to another aspect of the present invention, there is provided a method of transmitting display-related information from a synchronization apparatus to a source apparatus via a digital data interface of the synchronization apparatus, the method including generating the display-related information into which information about a playback capability of the synchronization apparatus has been inserted; and inserting information about a compressed data playback capability of the synchronization apparatus into the display-related information.

The method may further include transmitting the display-related information from the synchronization apparatus to the source apparatus via the digital data interface.

According to another aspect of the present invention, there is provided a method of receiving display-related information via a digital data interface of a source apparatus, the method including parsing received display-related information; extracting information about a playback capability of a synchronization apparatus from the parsed display-related information; and extracting information about a compressed data playback capability of the synchronization apparatus from the information about the playback capability of the synchronization apparatus.

The method may further include determining compressed data to be transmitted to the synchronization apparatus by using at least one selected from the group consisting of the information about the playback capability of the synchronization apparatus and the information about the compressed data playback capability of the synchronization apparatus.

The display-related information has a data structure capable of being transceived via the digital data interface.

The information about the compressed data playback capability of the synchronization apparatus may include at least one selected from the group consisting of information about a bitrate of compressed data capable of being played back by the synchronization apparatus, information about whether the synchronization apparatus is able to play back compressed data, information about the type of data stream of the compressed data capable of being played back by the synchronization apparatus, information about a compression method of the compressed data capable of being played back by the synchronization apparatus, information about a resolution of the compressed data capable of being played back by the synchronization apparatus, and information about 3D image compressed data that can be played back by the synchronization apparatus.

The information about the compressed data playback capability of the synchronization apparatus may be inserted into a reserved bit field of the display-related information or into new display-related information.

According to another aspect of the present invention, there is provided an apparatus for transmitting media data from a source apparatus to a synchronization apparatus via a digital data interface of the synchronization apparatus, the apparatus including a media data structure formation unit forming a media data structure into which compressed data obtained by compressing raw data has been inserted; an ancillary data insertion unit inserting ancillary data for the raw data into an ancillary data field included in the media data structure; and a compression-related information insertion unit inserting compression-related information about the compressed data into the ancillary data field of the media data structure.

According to another aspect of the present invention, there is provided a apparatus for transmitting display-related information from a synchronization apparatus to a source apparatus via a digital data interface of the synchronization apparatus, the apparatus including a display-related information generation unit generating the display-related information into which information about a playback capability of the synchronization apparatus has been inserted; and a compressed data playback capability information insertion unit inserting information about a compressed data playback capability of the synchronization apparatus into the display-related information.

According to another aspect of the present invention, there is provided an apparatus for receiving media data via a digital data interface of a synchronization apparatus, the apparatus including a media data parsing unit parsing received media data; a compression-related information extraction unit extracting compression-related information about compressed data obtained by compressing raw data, from an ancillary data field of the parsed media data, wherein ancillary data for the raw data has been inserted into the ancillary data field; a compressed data extraction unit extracting the compressed data from the parsed media data; and a decoding unit decoding the compressed data by using the compression-related information.

According to another aspect of the present invention, there is provided an apparatus for receiving display-related information via a digital data interface of a source apparatus, the method including a display-related information parsing unit parsing received display-related information; a playback capability information extraction unit extracting information about a playback capability of the synchronization apparatus from the parsed display-related information; and a compressed data playback capability information extraction unit extracting information about a compressed data playback capability of the synchronization apparatus from the information about the playback capability of the synchronization apparatus.

According to another aspect of the present invention, there is provided a computer-readable recording medium having recorded thereon a program for executing the method of transmitting media data from a source apparatus to a synchronization apparatus via a digital data interface of the synchronization apparatus.

According to another aspect of the present invention, there is provided a computer-readable recording medium having recorded thereon a program for executing the method of transmitting display-related information from a synchronization apparatus to a source apparatus via a digital data interface of the synchronization apparatus.

According to another aspect of the present invention, there is provided a computer-readable recording medium having recorded thereon a program for executing the method of receiving media data via a digital data interface of a synchronization apparatus.

According to another aspect of the present invention, there is provided a computer-readable recording medium having recorded thereon a program for executing the method of receiving display-related information via a digital data interface of a source apparatus.

In another exemplary embodiment of the invention, there is a system for transmitting display-related information, the system including: a synchronization apparatus connected to a source apparatus via a digital data interface, the synchronization apparatus including: a display-related information generation unit which generates the display-related information into which information about a playback capability of the synchronization apparatus has been inserted, and a display-related information transmission unit which transmits the display-related information to the source apparatus via the digital data interface, and a source apparatus including: a display-related information parsing unit which parses the display-related information transmitted from the synchronization apparatus, and a media data determination unit which determines a compressed data to be transmitted to the synchronization unit via the digital data interface, based on the display-related information.

BRIEF DESCRIPTION OF THE DRAWINGS

The above and other features and aspects of the present invention will become more apparent by describing in detail exemplary embodiments thereof with reference to the attached drawings in which:

FIG. 8 illustrates a Moving Picture Experts Group (MPEG) Source InfoFrame format;

FIG. 9 illustrates an InfoFrame format into which compression-related information has been inserted, according to an exemplary embodiment of the present invention;

FIG. 10 illustrates a display-related information format into which display-related information has been inserted, according to an exemplary embodiment of the present invention;

FIG. 11 is a flowchart of a method of receiving media data by using a digital data interface of a synchronization apparatus, according to an exemplary embodiment of the present invention;

FIG. 14 is a flowchart of a method of receiving display-related information by using a digital data interface of a synchronization apparatus, according to an exemplary embodiment of the present invention.

DETAILED DESCRIPTION OF THE INVENTION

A method and apparatus for receiving media data including compression-related information, a method and apparatus for transmitting media data including information about compression of the media data, a method and apparatus for transmitting display-related information including the information about the compression of the media data, and a method and apparatus for receiving display-related information including the information about the compression of the media data, according to exemplary embodiments of the present invention, will now be described with reference to FIGS. 1 through 14.

Figure 1:
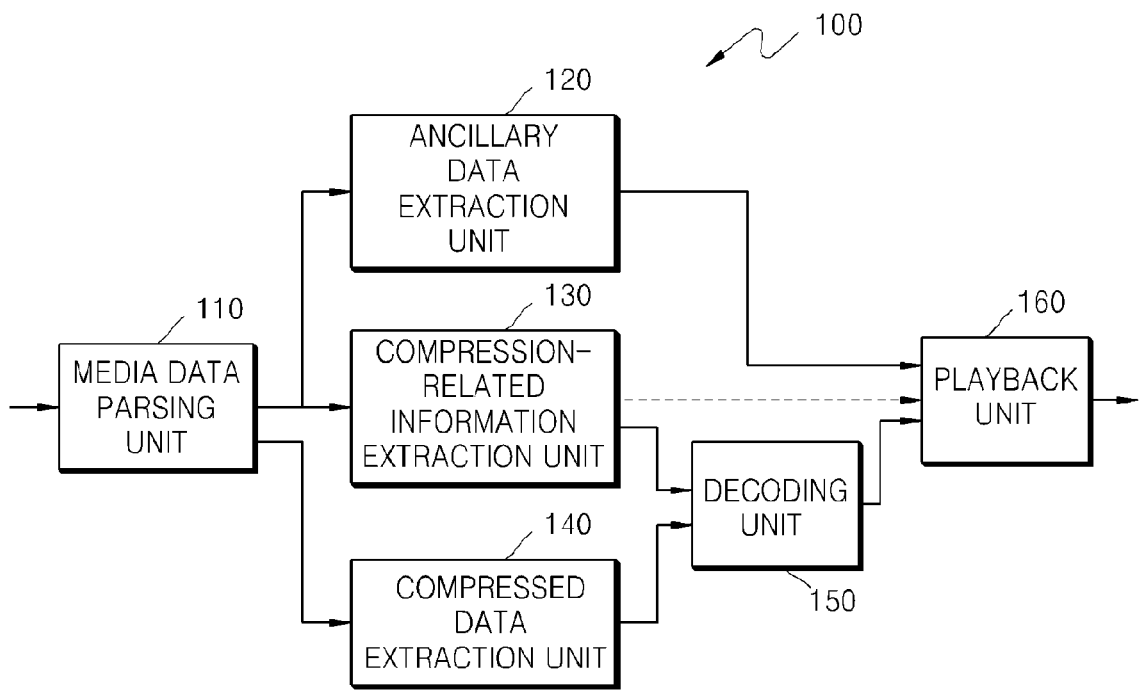
FIG. 1 is a block diagram of a media data receiving apparatus for receiving media data by using a digital data interface of a synchronization apparatus, according to an exemplary embodiment of the present invention.

FIG. 1 is a block diagram of a media data receiving apparatus 100 for receiving media data by using a digital data interface of a synchronization apparatus, according to an exemplary embodiment of the present invention.

The media data receiving apparatus 100 includes a media data parsing unit 110, an ancillary data extraction unit 120, a compression-related information extraction unit 130, a compressed data extraction unit 140, a decoding unit 150, and a playback unit 160. The media data receiving apparatus 100 may be installed in a synchronization terminal or a synchronization apparatus.

The synchronization apparatus may include a display such as a High Definition TV (HDTV), a recorder such as a Digital Versatile Disc Recorder (DVD-R), storage devices, and the like. A source apparatus may include a host apparatus such as a set-top box, a Personal Computer (PC), or the like.

The media data parsing unit 110 receives media data from the source apparatus and parses the media data. The received media data has a structure that enables transmission and reception via a digital data interface. For example, if the digital data interface follows a predetermined standard, the media data may have a structure that is defined in the predetermined standard of the digital data interface.

Through the parsing, the media data may be divided into a field in which the media data is stored (hereinafter, referred to as a media data field), and a field in which ancillary data is stored (hereinafter, referred to as an ancillary data field). The ancillary data extraction unit 120, the compression-related information extraction unit 130, and the compressed data extraction unit 140 may respectively extract data from the parsed media data and use the same.

The ancillary data extraction unit 120 extracts ancillary data for raw data from the ancillary data field of the media data and outputs the ancillary data to the playback unit 160.

For example, the ancillary data may include at least one of Auxiliary Video Information (AVI), Serial Presence Detect (SPD) information, audio information, Moving Picture Experts Group (MPEG) information, and general control information. The ancillary data extraction unit 120 may extract Internet Protocol (IP) data from the ancillary data field.

The compression-related information extraction unit 130 extracts compression-related information about data obtained by compressing raw data from the ancillary data field of the media data and outputs the compression-related information to the decoding unit 150. The data obtained by compressing raw data is hereinafter referred to as compressed data.

The compression-related information may include at least one of information about whether the compressed data is included in the media data, information about a bitrate of the compressed data, information about the type of a data stream of the compressed data, information about a compression method of the compressed data, information about a resolution of the compressed data, and information about three-dimensional (3D) image compressed data.

Several exemplary embodiments of information about the compressed data will now be described in greater detail. The information about the compressed data is hereinafter referred to as compression-related information.

In one exemplary embodiment, information about whether the compressed data has been inserted into the media data may be set as the compression-related information.

In another exemplary embodiment, information about the type of data stream of the compressed data inserted into the structure of the media data may be set as the compression-related information. The data stream of the compressed data may be an Elementary Stream (ES) or a Transport Stream (TS), for example.

In more detail, information about a file format or container of the compressed data having an ES format may be set as the compression-related information. For example, the file format or container of the compressed data may be a TS format, an Audio Video Interleave format (AVI format), an Advanced Systems Format (ASF) format, an MPEG-4 (MP4) format, a Matroska Video (MKV) format, a Flash Video (FLU) format, an Internet Protocol (IP) datagram format, or the like.

Information about a compression method for the compressed data may indicate a standard or profile followed by the compressed data. For example, information about what compression method from among various compression standards, such as MPEG2, H.264, and MPEG4, for example, is followed by a video codec used to compress the raw data, may be set as the compression-related information.

Information about profiles, such as, for example, a H.264 baseline profile (H.264 BP), a H.264 Main Profile (H.264 MP), a H.264 High Profile (H.264 HP), an MPEG4 Simple Profile (MPEG4 SP), and an MPEG4 Advanced Simple Profile (MPEG-4 ASP), may be set as the compression-related information.

Information about a resolution of the compressed data may be set as the compression-related information. For example, the resolution of the compressed data may be 2k×1k, 4k×2k, 8k×4k, or the like.

If the raw data of the compressed data is a 3D image, information about whether the compressed data has been inserted into the media data may be set as the compression-related information. Information about whether depth information is provided as 3D image-related information may be set as the compression-related information. Information about whether a camera parameter associated with cameras that have acquired 3D images is provided as 3D image-related information may also be set as the compression-related information.

The compression-related information extraction unit 130 may extract the compression-related information from a compression-related field or from a reserved bit field of an ancillary data frame inserted into the structure of the media data. Alternatively, the compression-related information extraction unit 130 may extract the compression-related information from an ancillary data frame that is different from the ancillary data frame that includes the ancillary data.

The compressed data extraction unit 140 extracts the compressed data from the parsed media data and outputs the compressed data to the decoding unit 150. The compressed data extraction unit 140 may extract the compressed data from an active video field or an ancillary data field, which are included in the structure of the media data. For example, if the ancillary data field is a vertical blanking interval (VBI) field or a horizontal blanking interval (HBI) field, the compressed data may be extracted from the VBI field, the HBI field, or the active video field.

The decoding unit 150 decodes the compressed data extracted by the compressed data extraction unit 140, by using the compression-related information extracted by the compression-related information extraction unit 130, and thus restores the raw data.

The playback unit 160 may play back the raw data restored by the decoding unit 150, by using the ancillary data extracted by the ancillary data extraction unit 120. If the compression-related information extracted by the compression-related information extraction unit 130 includes information required to play back the raw data, the playback unit 160 may play back the raw data by using the compression-related information.

According to communication conditions such as a data transmission speed, the media data receiving apparatus 100 may receive the compressed data in units of color components via a single data line or receive video data in units of color components via data lines for respective color components.

For example, a data field into which the compressed data has been inserted may have R-component data, G-component data, and B-component data according to an RGB color standard, or may have Y-component data, Cb-component data, and Cr-component data according to an YCbCr color standard. If a sufficient data transmission speed is not supported, data for different color components may be transmitted and received through different respective data lines.

If the data transmission speed is sufficiently high, all of the data pieces for color components may be transmitted using a single data line. For example, all of the R-component data, G-component data, and B-component data may be transmitted using a G-component data line, for example. All of the Y-component data, Cb-component data, and Cr-component data may be transmitted using a Y-component data line, for example.

Transmission and reception of high-resolution video images, high-quality video images, 3D-video images, and the like may be burdensome because the images may have very large amounts of data. To reduce this burden, high-resolution video images, high-quality video images, or 3D-video images may be compressed before transmission and reception. However, a display terminal must decompress the compressed data and then restore the raw data in order to display the raw data, and thus additional information may be needed to perform the decompression of the compressed data and the restoration of the raw data.

The media data receiving apparatus 100 may extract the ancillary data and the compression-related information, which are required to display the compressed data, from the media data that is able to be transmitted and received using the digital data interface. Thus, no special channels are needed to receive compression-related information by using an existing system, and restoration and display of 3D video images as well as compressed data may be performed even when using the existing system.

Figure 2:
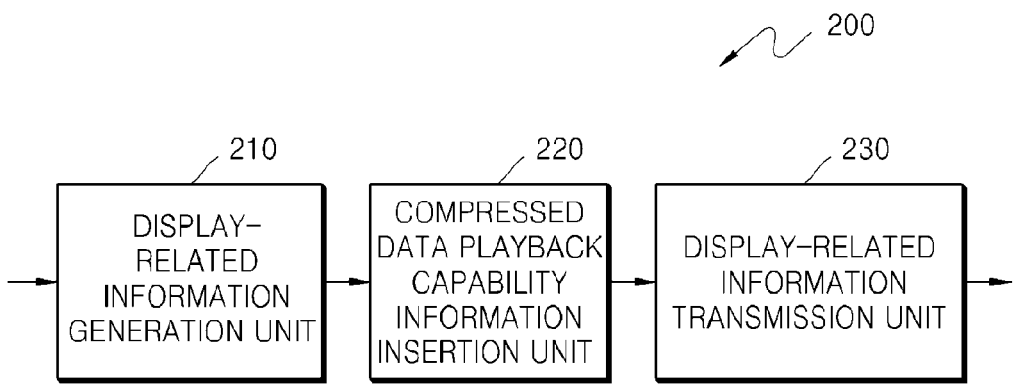
FIG. 2 is a block diagram of a display-related information transmitting apparatus for transmitting display-related information from a synchronization apparatus to a source apparatus by using a digital data interface of the synchronization apparatus, according to an exemplary embodiment of the present invention.

FIG. 2 is a block diagram of a display-related information transmitting apparatus 200 for transmitting display-related information from a synchronization apparatus to a source apparatus by using a digital data interface of the synchronization apparatus, according to an exemplary embodiment of the present invention;

The display-related information transmitting apparatus 200 includes a display-related information generation unit 210, a compressed data playback capability information insertion unit 220, and a display-related information transmission unit 230. The display-related information transmitting apparatus 200 may be installed in the synchronization apparatus or the synchronization terminal.

The display-related information generation unit 210 generates display-related information that includes information about a playback capability of the synchronization apparatus, and outputs the display-related information to the compressed data playback capability information insertion unit 220.

For example, the information about the playback capability of the synchronization apparatus may include information about a manufacturer of the synchronization apparatus, a product type, model information, a version, timing information, resolutions capable of being supported by the synchronization apparatus, a color format supported, pixels and audio capabilities, and 3D image capabilities.

If the display-related information is transmitted and received via a digital data interface and the digital data interface follows a predetermined standard, the display-related information may be set to have a data structure defined in that predetermined standard.

The compressed data playback capability information insertion unit 220 inserts information about the compressed data playback capability of the synchronization apparatus into the display-related information received from the display-related information generation unit 210 and outputs the display-related information to the display-related information transmission unit 230.

The compressed data playback capability of the synchronization apparatus may represent at least one characteristic such as of the fact whether the synchronization apparatus is able to play back the compressed data, a bitrate of compressed data capable of being played back by the synchronization apparatus, the type of data stream of the compressed data capable of being played back by the synchronization apparatus, a compression method of the compressed data capable of being played back by the synchronization apparatus, and a resolution of the compressed data capable of being played back by the synchronization apparatus. If the compressed data is compressed data obtained by compressing a 3D image, information about whether the synchronization apparatus is able to play back the compressed data of the 3D image may be included in the information about the compressed data playback capability.

Several exemplary embodiments of the information about the compressed data playback capability of the synchronization apparatus will now be described in greater detail.

For example, information about whether the synchronization apparatus is able to recognize and play back the compressed data may be set as the information about the compressed data playback capability of the synchronization apparatus.

The data stream of the compressed data that the synchronization apparatus can play back may be, for example, an ES or a TS. Information about the type of the data stream of the compressed data that the synchronization apparatus can play back may therefore be set as the information about the compressed data playback capability of the synchronization apparatus.

Information about a file format or container may be included in the information about the compressed data playback capability of the synchronization apparatus, to serve as detailed information about the type of data stream of the compressed data that the synchronization apparatus can play back. For example, the file format or container of a data stream may include a TS format, an AVI format, an ASF format, an MP4 format, an MKV format, a FLU format, an IP datagram format, etc.

An exemplary embodiment of the information about the compressed data playback capability of the synchronization apparatus, information about a compression method of the compressed data that the synchronization apparatus can play back may represent a standard or profile that is followed by the compressed data that the synchronization apparatus can play back.

For example, information about what compression method from among compression standards, such as MPEG2, H.264, and MPEG4, is followed by a video codec used to compress the raw data, may be set as the information about the compressed data playback capability of the synchronization apparatus. Information about a profile, such as, a H.264 BP, a H.264 MP, a H.264 HP, an MPEG4 SP, and an MPEG4 ASP, may be set as the information about the compressed data playback capability of the synchronization apparatus.

In another exemplary embodiment, information about a resolution that the synchronization apparatus supports may be set as the compressed data playback capability of the synchronization apparatus. For example, a resolution supported by the synchronization apparatus may be set to 2k×1k, 4k×2k, 8k×4k, or the like.

In another exemplary embodiment, if the raw data of the compressed data is a 3D image, information about whether the synchronization apparatus is able to play back the compressed data of the 3D image may be set as the information about the compressed data playback capability of the synchronization apparatus.

In another exemplary embodiment, if depth information is provided as 3D image-related information, information about whether the synchronization apparatus is able to recognize the depth information and use the same to play back a 3D image may be set as the information about the compressed data playback capability of the synchronization apparatus. If a camera parameter associated with cameras that have acquired 3D images is provided as 3D image-related information, information about whether the synchronization apparatus is able to use the camera parameter when recognizing the camera parameter and playing back a 3D image may be set as the information about the compressed data playback capability of the synchronization apparatus.

The compressed data playback capability information insertion unit 220 may insert the information about the compressed data playback capability of the synchronization apparatus into a reserved bit field of the display-related information or into new display-related information.

The display-related information transmission unit 230 transmits the display-related information received from the compressed data playback capability information insertion unit 220 to the source apparatus via the digital data interface. For example, if the display-related information transmitting apparatus 200 is installed in the synchronization apparatus, the display-related information may be transmitted from the synchronization apparatus to the source apparatus via the digital data interface.

Figure 3:
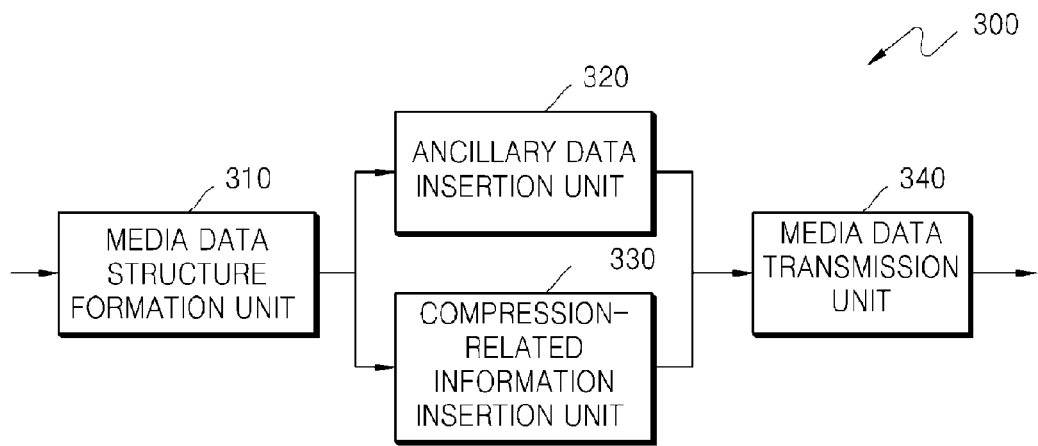
FIG. 3 is a block diagram of a media data transmitting apparatus for transmitting media data from a source apparatus to a synchronization apparatus by using a digital data interface of the synchronization apparatus, according to an exemplary embodiment of the present invention.

FIG. 3 is a block diagram of a media data transmitting apparatus 300 for transmitting media data from a source apparatus to a synchronization apparatus by using a digital data interface of the synchronization apparatus, according to an exemplary embodiment of the present invention.

The media data transmitting apparatus 300 includes a media data structure formation unit 310, an ancillary data insertion unit 320, a compression-related information insertion unit 330, and a media data transmission unit 340. The media data transmitting apparatus 300 may be installed in a source apparatus, such as a host apparatus (for example, a set-top box or a PC), or in a source terminal.

The media data structure formation unit 310 generates a media data structure into which compressed data obtained by compressing raw data has been inserted. The media data structure may include an active data field into which actual media data is inserted and an ancillary data field into which pieces of ancillary data are inserted. In this case, the compressed data may be inserted into the active data field or the ancillary data field of the media data structure.

The ancillary data insertion unit 320 inserts the ancillary data pieces for the raw data into the ancillary data field formed by the media data structure formation unit 310. The ancillary data field of the media data structure may be, for example, a VBI field, a HBI field, or a combination of the two fields.

For example, the ancillary data may include at least one of various pieces of information about the raw data, such as, Audio Video Information (AVI), SPD information, audio information, MPEG information, general control information, etc. The ancillary data insertion unit 320 may insert IP data into the ancillary data field.

The compression-related information insertion unit 330 inserts compression-related information about compressed data obtained by compressing raw data into the ancillary data field of the media data structure formed by the media data structure formation unit 310.

For example, the compression-related information may include information about whether the compressed data is included in the media data, information about a bitrate of the compressed data, information about the type of data stream of the compressed data, information about a compression method of the compressed data, information about a resolution of the compressed data, and information about 3D image compressed data. The compression-related information may correspond to the compression-related information described above with reference to the media data receiving apparatus 100.

The compression-related information insertion unit 330 may insert the compression-related information into a compression-related field or a reserved field of an existing ancillary data frame which has been previously generated. Alternatively, the compression-related information insertion unit 330 may insert the compression-related information into an ancillary data frame which has been newly generated.

The media data transmission unit 340 transmits the media data, into which the compressed data has been inserted and also, the ancillary data and the compression-related information have been inserted by the ancillary data insertion unit 320 and the compression-related information insertion unit 330, to the synchronization apparatus via the digital data interface. If the media data transmitting apparatus 300 is installed in the source apparatus, the media data may be transmitted from the source apparatus to the synchronization apparatus via the digital data interface.

The media data transmission unit 340 may transmit all respective color-component data pieces of the compressed data via a single data line or via different data lines according to transmission and reception conditions such as a data transmission speed.

Figure 4:
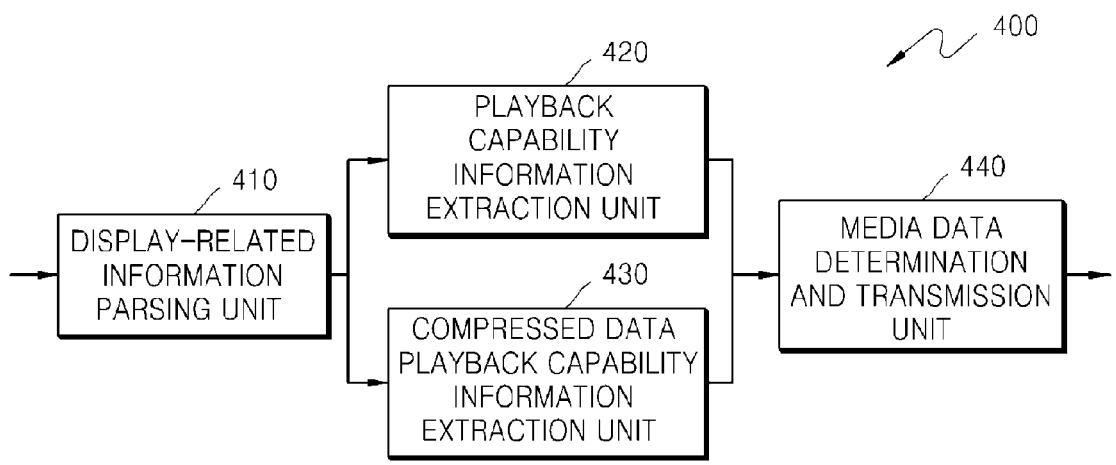
FIG. 4 is a block diagram of a display-related information receiving apparatus for receiving display-related information by using a digital data interface of a synchronization apparatus, according to an exemplary embodiment of the present invention.

FIG. 4 is a block diagram of a display-related information receiving apparatus 400 for receiving display-related information by using a digital data interface of a synchronization apparatus, according to an exemplary embodiment of the present invention.

The display-related information receiving apparatus 400 includes a display-related information parsing unit 410, a playback capability information extraction unit 420, a compressed data playback capability information extraction unit 430, and a media data determination and transmission unit 440. The display-related information receiving apparatus 400 may be, for example, installed in the source apparatus or the source terminal.

The display-related information parsing unit 410 parses received display-related information. In an exemplary embodiment, the display-related information is transmitted by the synchronization apparatus and received by the source apparatus via a digital data interface.

The playback capability information extraction unit 420 extracts information about a playback capability of the synchronization apparatus from the parsed display-related information. The information about the playback capability of the synchronization apparatus is provided to the source apparatus so that the source apparatus may transmit media data, which corresponds to a playback capability of the synchronization apparatus, to the synchronization apparatus and that the synchronization apparatus may thereby perform display-related processes. For example, the information about the playback capability of the synchronization apparatus may include information about the manufacturer of the synchronization apparatus, a product type, model information, a version, timing information, supported resolutions, a color format supported, pixels and audio capabilities, and 3D image capabilities.

The compressed data playback capability information extraction unit 430 extracts information about a compressed data playback capability of the synchronization apparatus from the information about the playback capability of the synchronization apparatus. The information about the compressed data playback capability of the synchronization apparatus represents information about the compressed data that may be displayed by the synchronization apparatus.

The information about the compressed data playback capability of the synchronization apparatus may be information about whether the synchronization apparatus is able to play back compressed data, information about a bitrate of compressed data that can be played back by the synchronization apparatus, information about a type of data stream of the compressed data, information about a compression method of the compressed data, information about a resolution of the compressed data, or information about 3D image compressed data that can be played back by the synchronization apparatus. The information about the compressed data playback capability of the synchronization apparatus may correspond to the information about the compressed data playback capability of the display-related information transmitting apparatus 200 described above with reference to FIG. 2.

The media data determination and transmission unit 440 may determine which compressed data is to be transmitted to the synchronization apparatus, by using information about the playback capability of the synchronization apparatus extracted by the playback capability information extraction unit 420. The media data determination and transmission unit 440 may determine which compressed data is to be transmitted to the synchronization apparatus, by using the information about the compressed data playback capability of the synchronization apparatus extracted by the compressed data playback capability information extraction unit 430. In other words, the media data determination and transmission unit 440 may determine and transmit media data that can be displayed by the synchronization apparatus, based on the information about the playback capability of the synchronization apparatus, based on the information about the compressed data playback capability, or based on both the information about the playback capability of the synchronization apparatus and the information about the compressed data playback capability.

Each of the media data receiving apparatus 100, the display-related information transmitting apparatus 200, the media data transmitting apparatus 300, and the display-related information receiving apparatus 400 handles data that is generated according to a data structure capable of being recognized and transceived by a digital data interface and into which various pieces of information may have been inserted, in order to perform data transmission and reception through the digital data interface. In particular, if the digital data interface follows a predetermined standard, pieces of data that are transceived via the digital data interface may also be formed according to a data structure that follows the predetermined standard.

If the media data is not raw data but compressed data, the compressed data and various pieces of additional information about the compressed data may be inserted into the media data and transceived.

Therefore, the display-related information transmitting apparatus 200 may generate display-related information about a data structure capable of being transceived by the digital data interface, insert information about reproducibility or non-reproducibility of the compressed data or IP data into the display-related information, and output the display-related information via the digital data interface.

The media data receiving apparatus 100 may receive media data having the data structure capable of being transceived by the digital data interface, and may extract compressed data, compression-related information, or IP data from the media data.

The media data transmitting apparatus 300 may generate media data having the data structure capable of being transceived by the digital data interface, may insert compressed data, compression-related information, or IP data into the media data, and output the media data.

The display-related information receiving apparatus 400 may receive media data having the data structure capable of being transceived by the digital data interface, and may extract IP data or information about reproducibility or non-reproducibility of compressed data from the media data.

Therefore, the media data receiving apparatus 100, the display-related information transmitting apparatus 200, the media data transmitting apparatus 300, and the display-related information receiving apparatus 400 may transceive additional information, by transceiving compressed data and compression-related information by using a data structure that a digital data interface based on an existing standard is able to transceive. The use of the compressed data and the compression-related information transceived via the digital data interface may therefore be used in, for example, reproduction of high-resolution video images, superhigh-resolution video images, or 3D-video images.

Exemplary embodiments applied to a system that complies with the High-Definition Multimedia Interface (HDMI), which is an existing standard for digital data interfaces, will now be described with reference to FIGS. 5A through 10.

Figure 5A:
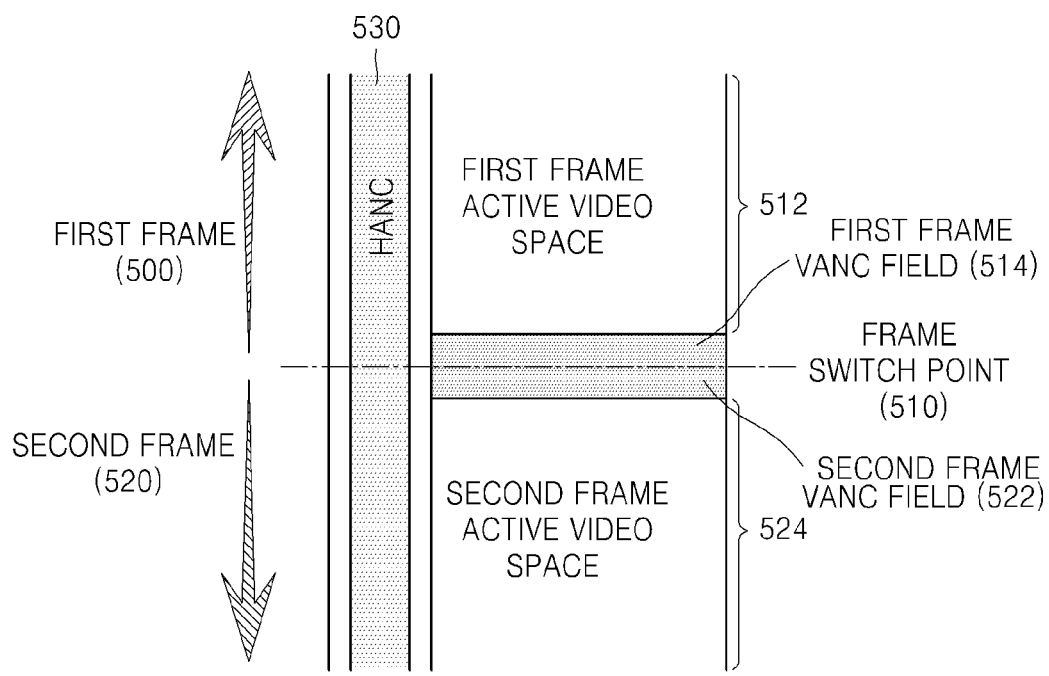
FIGS. 5A and 5B illustrate a structure of data which is transmitted using a High-Definition Multimedia Interface (HDMI)
Figure 5B:
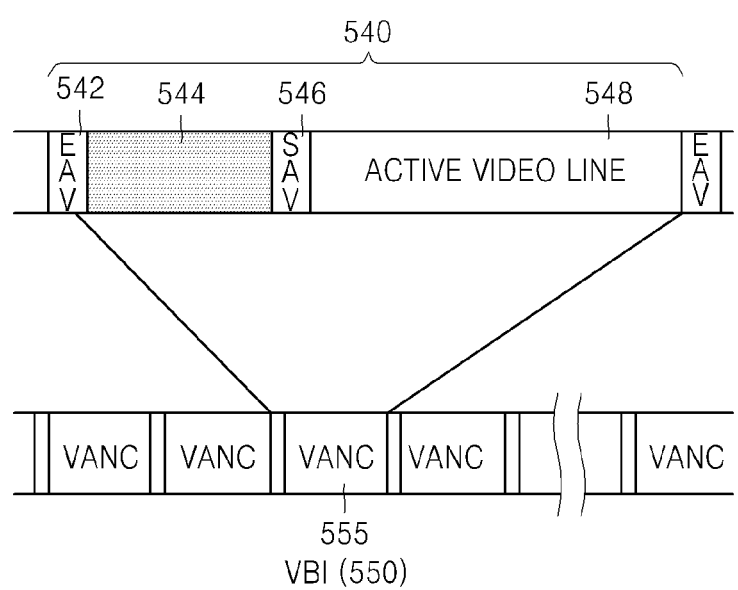

FIGS. 5A and 5B illustrate a structure of data which is transmitted using the HDMI.

Media data transmitted via a digital data interface such as the HDMI may include video data and ancillary data associated with the video data. Referring to FIG. 5A, the media data may be made up of consecutive frames that are distinguished from one another by a frame switch point 510. In other words, the video data and the ancillary data may be included in each frame, such as a first frame 500, a second frame 520, and the like of the media data.

Raw video data may be inserted into a first frame active video space 512 and a second frame active video space 524, and vertical ancillary data (V-ANC) for the raw video data may be inserted into both the first frame vertical ancillary data field 514 and the second frame vertical ancillary data field 522. Horizontal ancillary data (HANC) for the raw video data may be inserted into a horizontal ancillary data field 530.

Vertical ancillary data (VANC) may be inserted into a front or rear end of each frame. For example, the first frame vertical ancillary data field 514 is located at a rear end of the first frame 500, and the second frame vertical ancillary data field 516 is located at a front end of the second frame 520.

As illustrated in FIG. 5B, an end of active video (EAV) 542, HANC 544, a start of active video (SAV) 546, and an active video line 548 may be inserted into an active video interval 540. VANCs may be inserted into a VBI 550.

A field for the HANC 544 may be located in the active video interval 540 corresponding to VANC 555 of the VBI 550. Embedded audio for the active video line 548 may be inserted into the field for the HANC 544.

Figure 6:
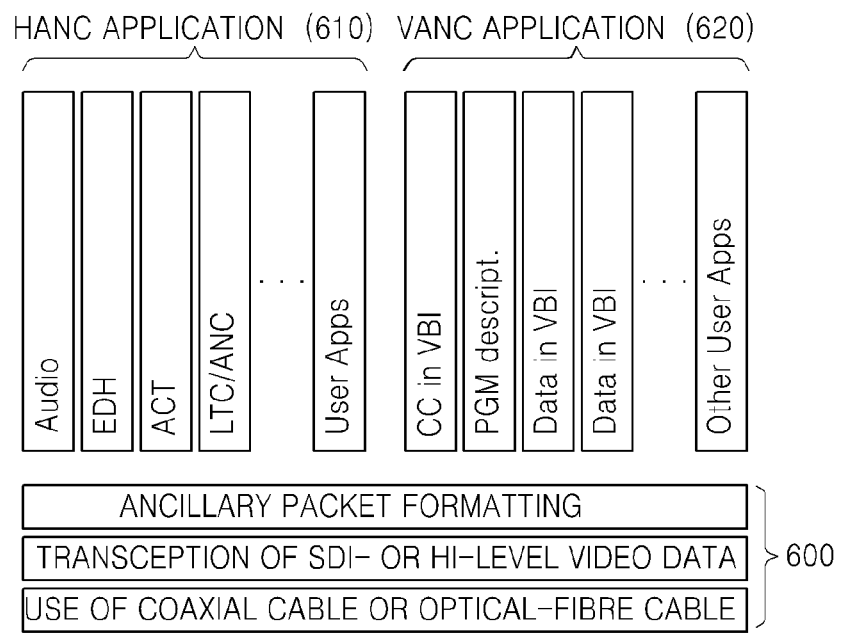
FIG. 6 illustrates ancillary data included in data that is transmitted using an HDMI.

FIG. 6 illustrates ancillary data included in data that is transmitted via the HDMI.

Various types of ancillary data that may be inserted into an HANC field or a VANC field may be defined according to standards. For example, an HDMI environment 600 is illustrated, in which an ancillary packet may be formatted according to SMPTE 291M, an image-related apparatus standard determined by the Society of Motion Picture and Television Engineers, Serial Digital Interface (SDI)-level or HD-level video data may be transceived according to SMPTE 259M or 292, and a coaxial cable or an optical-fiber cable may be used.

An HANC application 610 may include audio information, Error Detection and Handling (EDH) information, Ancillary Time Code (ATC) information, Linear Time code/Ancillary Time Code (LTC/ANC) information, User Applications, or the like.

A VANC application 620 may include a Closed Captioning information in a VBI, a Program Mode (PGM) Descriptor, data in the VBI, other User Applications, and the like.

Figure 7:
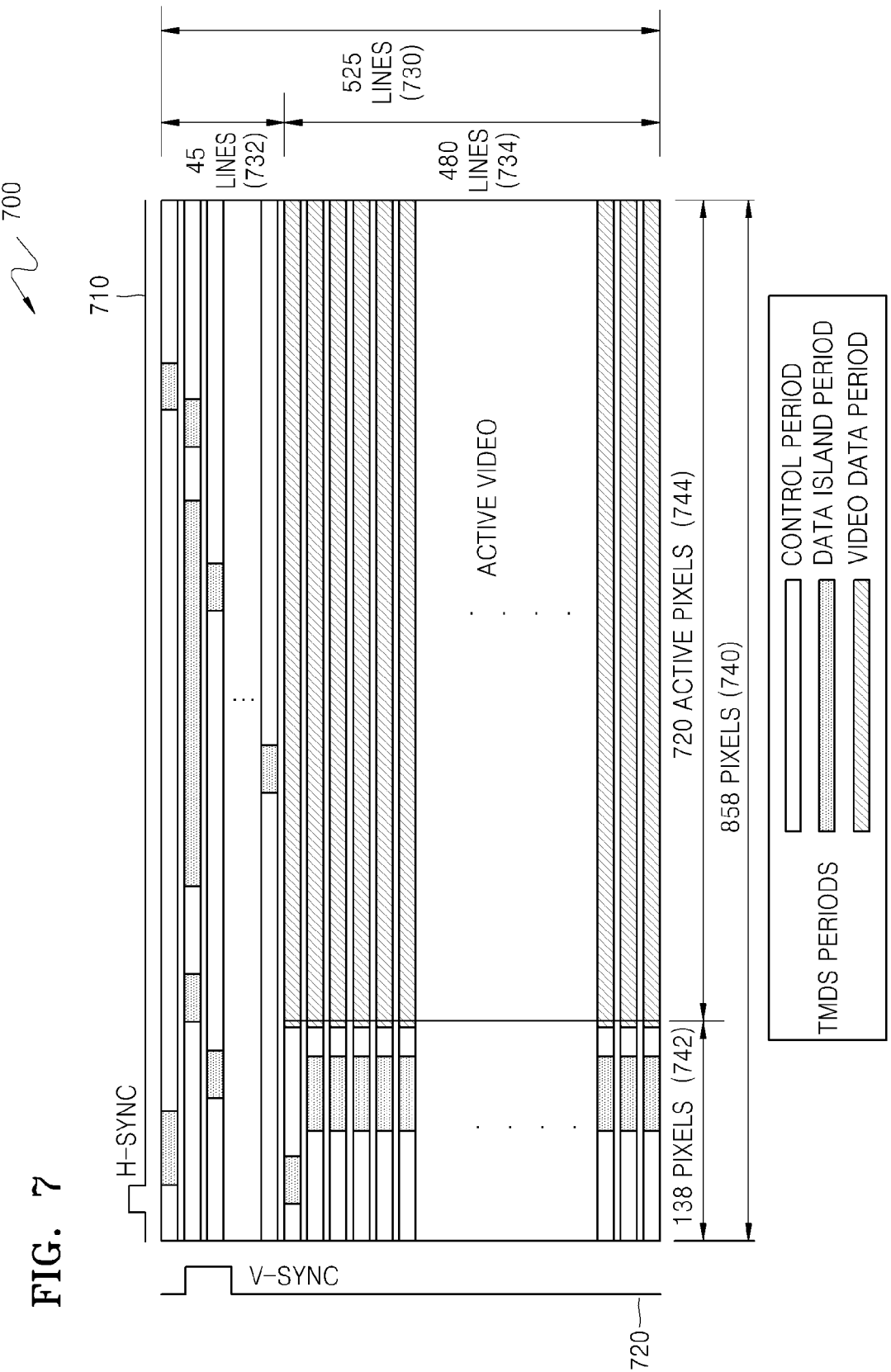
FIG. 7 illustrates a detailed structure of a single frame of data that is transmitted using an HDMI.

FIG. 7 illustrates a detailed structure of a single frame included in data that is transmitted using the HDMI.

A Transition Minimized Differential Signaling (TMDS) method is a high-speed serial data transmission technique for digital data interfaces, and is used in various digital data interfaces such as a digital video interface (DVI), an HDMI video interface, and the like. An HDMI link that follows the TMDS method may operate in a video data period, a data island period, or a control period.

In the video data period, active pixels of the active video line are transmitted. In the data island period, audio data and ancillary data are transmitted in the form of consecutive packets. When video data, audio data, or ancillary data do not need to be transmitted, the control period is activated. The control period may be located between two different periods.

Referring to FIG. 7, a media data frame 700 based on the TMDS method is transmitted in synchronization with an H sync 710 and a V sync 720. The media data frame 700 is made up of a total of 525 lines 730, and each of the lines 730 includes a total of 858 pixels 740.

A video data field of the media data frame 700 is made up of 720×480 pixels, namely, 480 active lines 734 and 720 active pixels 744 for each of the active lines 734. VANC may be inserted into a VBI field having 45 lines 732, and HANC may be inserted into 138 pixels 742 for each line of the HBI.

FIG. 8 illustrates an MPEG Source InfoFrame format.

The TMDS method uses an Auxiliary Video Information (AVI) InfoFrame format 800 and an audio InfoFrame format in order to include ancillary data that describes characteristics of an active video stream and an active audio stream.

Referring to FIG. 8, items such as an InfoFrame type code 810, an InfoFrame version number 815, an MPEG source InfoFrame length 820, and first through tenth data bytes 825 through 870, may be set in the AVI InfoFrame format 800 in order to describe various characteristics of the active video stream.

For example, in the AVI InfoFrame format 800, the InfoFrame type code 810 is set to be '$05_{16}$', the InfoFrame version number 815 is set to be '$01_{16}$', and the MPEG source InfoFrame length 820 is set to be '10'. A zero-th MPEG bitrate MB#0, a first MPEG bitrate MB#1, a second MPEG bitrate MB#2, and a third MPEG bitrate MB#3 are inserted into the first data byte 825, the second data byte 830, the third data byte 835, and the fourth data byte 840, respectively.

The fifth data byte 845 may include ancillary data about 'FR0', being field Repeat information, and ancillary data about 'MF0' and 'MF1', being an MPEG frame indicator representing that a current frame is an I frame, a B frame, or a P frame.

Reserved bit fields in which no information is set, such as, F57, F56, F55, F53, and F52, F67 through F60, F77 through F70, F87 through F80, F97 through F90, and F107 through F100, may exist in the fifth through tenth data bytes 845, 850, 855, 860, 865, and 870, respectively.

The media data receiving apparatus 100 may receive media data into which ancillary data having a format such as the AVI InfoFrame format 800 has been inserted, and extract the ancillary data from the media data. At this time, compression-related information about the video data may be extracted from the reserved bit fields or a new field of the AVI InfoFrame format 800.

The media data transmitting apparatus 300 may insert ancillary data having a format such as the AVI InfoFrame format 800 into media data and transmit the media data including the ancillary data. At this time, compression-related information about compressed data obtained by compressing raw data may be inserted into the reserved bit fields or a new field of the AVI InfoFrame format 800.

An exemplary case where compression-related information is inserted using the reserved bit field of the AVI InfoFrame format 800 will now be described.

Information about a bitrate of the compressed data may be inserted into the first through fourth data bytes 825, 830, 835, and 840. The reserved bit field 'F57' of the fifth data byte 845 may include information about whether the compressed data has been inserted into the media data. For example, if 'F57=1' is set, it represents that the compressed data has been inserted into the media data.

Information about a data stream format of the compressed data may be inserted into the sixth data byte 850. For example, a flag representing whether the compressed data has a video ES format may be inserted into the reserved bit field 'F67' of the sixth data byte 850. Information about whether the compressed data has a TS format, and information about a file format or container of the compressed data may be set using the reserved bit fields 'F66' through 'F70'. Examples of the file format or container may include an AVI format, an ASF format, an MP4 format, an MKV format, an FLU format, an IP datagram, etc.

Information about the type of video codec may be inserted into the seventh data byte 855. For example, information about a compression method that is followed by the corresponding compressed data from among video compression standards, such as an MPEG2 method, an H.264 BP method, an H.264 MP method, an H.264 HP method, an MPEG4 SP method, and an MPEG4 ASP method, may be inserted into the seventh data byte 855.

Information about a resolution of the compressed data may be inserted into the eighth data byte 860. For example, the resolution of the compressed data may be 2k×1k, 4k×2k, or 8k×4k.

Information about 3D-image compressed data may be inserted into the ninth data byte 865. For example, information about whether the compressed data is 3D-image compressed data, information about whether depth image data exists, information about whether camera parameter information exists, and other information may be inserted into the ninth data byte 865.

FIG. 9 illustrates an exemplary InfoFrame format into which compression-related information has been inserted, according to an exemplary embodiment of the present invention.

The media data transmitting apparatus 300 may generate a new AVI InfoFrame format 900 and insert ancillary data into the new AVI InfoFrame format 900. At this time, the compression-related information about the compressed data for the raw data may be inserted into the AVI InfoFrame format 900.

The media data receiving apparatus 100 may receive media data into which the AVI InfoFrame format 900 in which ancillary data corresponding to the compression-related information is set has been inserted, and extract the ancillary data from the media data.

Items, such as an InfoFrame type code 910, an InfoFrame version number 915, an MPEG source InfoFrame length 920, a first data byte 925, a second data byte 930, a third data byte 935, a fourth data byte 940, a fifth data byte 945, a sixth data byte 950, a seventh data byte 955, an eighth data byte 960, a ninth data byte 965, and a tenth data byte 970, may be set in the new AVI InfoFrame format 900.

For example, if ancillary data associated with compressed data is set using a new AVI InfoFrame, the InfoFrame type code 910 may be set to be '06 h' as a compressed data InfoFrame. A version number of an InfoFrame into which ancillary data for compressed data has been inserted may be set in the InfoFrame version number 915, and a length of the compressed data may be set in the MPEG source InfoFrame length 920.

A zero-th bitrate 'BR#0', a first bitrate 'BR#1', a second bitrate 'BR#2', and a third bitrate 'BR#3' may be inserted into the first data byte 925, the second data byte 930, the third data byte 935, and the fourth data byte 940, respectively.

Information about the type of a data stream for the compressed data may be inserted into the fifth data byte 945. For example, information about whether the compressed data is in the form of a video ES or a video TS, and information about a file format or container of the compressed data may be set in the fifth data byte 945.

Information about the type of video codec may be inserted into the sixth data byte 950, and information about a resolution of the compressed data may be inserted into the seventh data byte 955.

Information about the 3D-image compressed data may be inserted into the eighth data byte 960. For example, information about whether the compressed data is 3D-image compressed data, information about whether depth image data exists, information about whether camera parameter information exists, and other information may be inserted into the eighth data byte 960.

FIG. 10 illustrates a exemplary display-related information format into which display-related information has been inserted, according to an exemplary embodiment of the present invention.

Extended Display Identification Data (EDID) may be generated as display-related information used to describe the multi-media display capability of a synchronization apparatus.

A synchronization apparatus that follows a CEA-861 standard established by the Consumer Electronics Association (CEA) additionally inserts a CEA data block as a CEA extension into the EDID. The CEA data block may include information about a manufacturing company, information about a product type, information about the version of display-related information, timing information, resolution information, color format information, pixel information, audio-related information, and the like.

The display-related information transmitting apparatus 200 may additionally insert the information about the compressed data playback capability into the display-related information. For example, if the display-related information transmitting apparatus 200 follows the CEA-861 standard, a new CEA data block into which information about the compressed data playback capability is to be inserted may be additionally inserted into the EDID.

The display-related information receiving apparatus 400 may additionally extract the information about the compressed data playback capability from the display-related information. For example, if the display-related information receiving apparatus 400 follows the CEA-861 standard, the information about the compressed data playback capability may be extracted from the new CEA data block of the EDID.

Items such as a first data byte 1010, a second data byte 1015, a third data byte 1020, a fourth data byte 1025, a fifth data byte 1030, a sixth data byte 1035, a seventh data byte 1040, an eighth data byte 1045, a ninth data byte 1050, and a tenth data byte 1055 may be set in a CEA data block format 1000.

A tag code and a length of a compressed data block may be set in the first data byte 1010. For example, if a CEA data block is an existing data block and has an extended tag for transmitting ancillary data, a tag code may be set to be '07 h'. Since the extended tag of the CEA data block includes at least one reserved bit, if a new data block is defined in a reserved bit field, ancillary data about the compressed data playback capability may be inserted into the new data block. An extended tag code of the new data block into which the ancillary data is to be inserted may be set in the second data byte 1015.

A zero-th bitrate 'BR#0', a first bitrate 'BR#1', a second bitrate 'BR#2', and a third bitrate 'BR#3' in association with bitrates capable of being covered by the synchronization apparatus may be inserted into the third data byte 1020, the fourth data byte 1025, the fifth data byte 1030, and the sixth data byte 1035, respectively.

Information about the type of data stream for compressed data capable of being displayed by the synchronization apparatus may be inserted into the seventh data byte 1040. For example, information about whether the compressed data capable of being displayed by the synchronization apparatus is in the form of a video ES or a video TS, and information about a file format or container of the compressed data may be set in the seventh data byte 1040.

Information about a video codec of the compressed data capable of being displayed by the synchronization apparatus may be inserted into the eighth data byte 1045, and information about a resolution of the compressed data capable of being displayed by the synchronization apparatus may be inserted into the ninth data byte 1050.

Information about 3D-image compressed data capable of being displayed by the synchronization apparatus may be inserted into the tenth data byte 1055. For example, information about whether the compressed data is 3D-image compressed data, information about whether depth image data exists, information about whether camera parameter information exists, and other information may be set in the tenth data byte 1055.

FIG. 11 is a flowchart of a method of receiving media data by using a digital data interface of a synchronization apparatus, according to an exemplary embodiment of the present invention.

In operation 1110, media data is received via the digital data interface of the synchronization apparatus and parsed. For example, if the digital data interface follows a predetermined standard, the media data may have a structure that is based on the predetermined standard of the digital data interface. Accordingly, the media data may be transceived between the synchronization apparatus and a source apparatus via the digital data interface.

According to a data transmission speed, data pieces for respective color components of the compressed data may be transmitted via a single data line or received via data lines for the respective color components.

In operation 1120, ancillary data for raw data is extracted from the ancillary data field of the parsed media data. The media data may be divided into the ancillary data field and an active data field. Additional information pieces such as the ancillary data for the raw data may be inserted into the ancillary data field, and the raw data and the like may be inserted into the active data field. The ancillary data may include Auxiliary Video Information (AVI), SPD information, audio information, MPEG information, and general control information.

In operation 1130, compression-related information about compressed data obtained by compressing the raw data is extracted from the ancillary data field of the media data. The compression-related information may be information about whether the compressed data has been included in the media data, information about a bitrate of the compressed data, information about the type of a data stream of the compressed data, information about a compression method of the compressed data, information about a resolution of the compressed data, and information about 3D image compressed data.

In operation 1140, the compressed data is extracted from the parsed media data. The compressed data may be extracted from the active video field, the ancillary data field of the media data, or both the active video field and the ancillary data field of the media data.

In operation 1150, the compressed data is decoded using the compression-related information. If the compressed data is decoded and thus the raw data is restored, the raw data may be displayed using the ancillary data, the compression-related information, or both the ancillary data and the compression-related information.

The compression-related information, which is required to display the compressed data, may be extracted from the media data that is able to be transceived using the digital data interface. Thus, no special channels may be required to receive the compression-related information, and restoration and display of 3D video images as well as the compressed data may be performed even when using the existing system.

Figure 12:
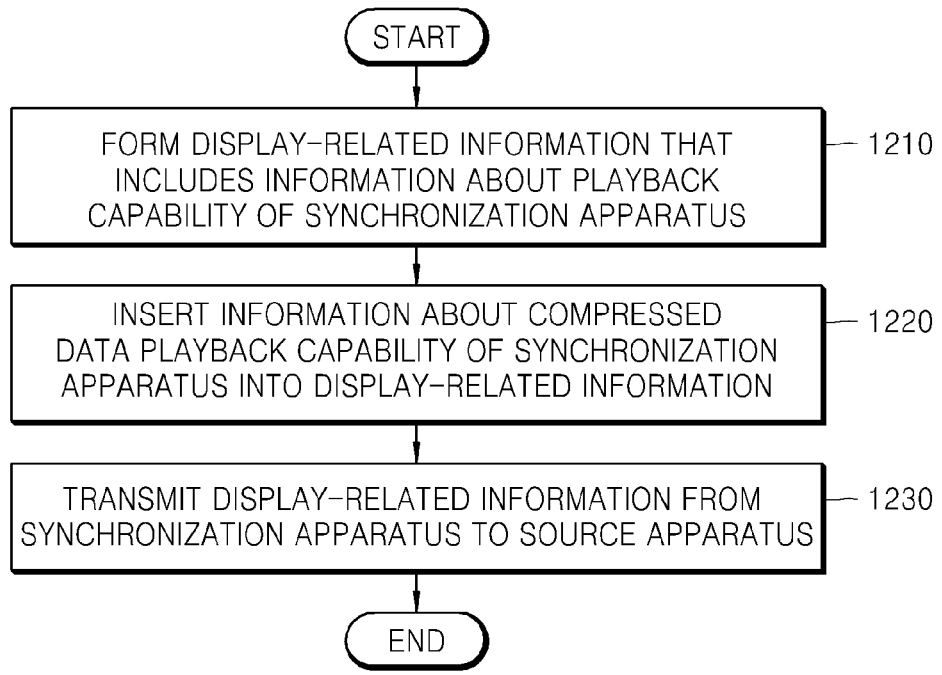
FIG. 12 is a flowchart of a method of transmitting display-related information from a synchronization apparatus to a source apparatus by using a digital data interface of the synchronization apparatus, according to an exemplary embodiment of the present invention.

FIG. 12 is a flowchart of a method of transmitting display-related information from a synchronization apparatus to a source apparatus by using a digital data interface of the synchronization apparatus, according to an exemplary embodiment of the present invention.

In operation 1210, display-related information that includes information about the playback capability of the synchronization apparatus may be formed.

In operation 1220, information about the compressed data playback capability of the synchronization apparatus may be inserted into the display-related information. The display-related information may include information about characteristics of compressed data capable of being displayed in a display terminal of the synchronization apparatus. For example, the display-related information may include information about whether the synchronization apparatus is able to display compressed data, information about a bitrate of compressed data capable of being displayed by the synchronization apparatus, information about types of data streams, information about compression methods, information about resolutions supported, and information about whether the synchronization apparatus is able to display 3D image compressed data, and the like.

In operation 1230, the display-related information may be transmitted from the synchronization apparatus to the source apparatus via the digital data interface.

If the digital data interface follows a predetermined standard, the display-related information may also be transceived via the digital data interface by being set to have a data structure that conforms to that predetermined standard of the digital data interface.

A display environment may therefore be established by transmitting a information about media that can be displayed by the synchronization apparatus, from the synchronization apparatus to the source apparatus. In particular, since whether the synchronization apparatus can deal with compressed data that corresponds to a playback capability independent from a general playback capability, special information about the possibility of playback may be needed.

Accordingly, in the method of transmitting the display-related information from the synchronization apparatus to the source apparatus by using the digital data interface of the synchronization apparatus, information about the capability of playing back the compressed data is inserted into display-related information used in an existing system. Thus, pieces of ancillary data may be transceived using the existing system without including special transmission channels.

Figure 13:
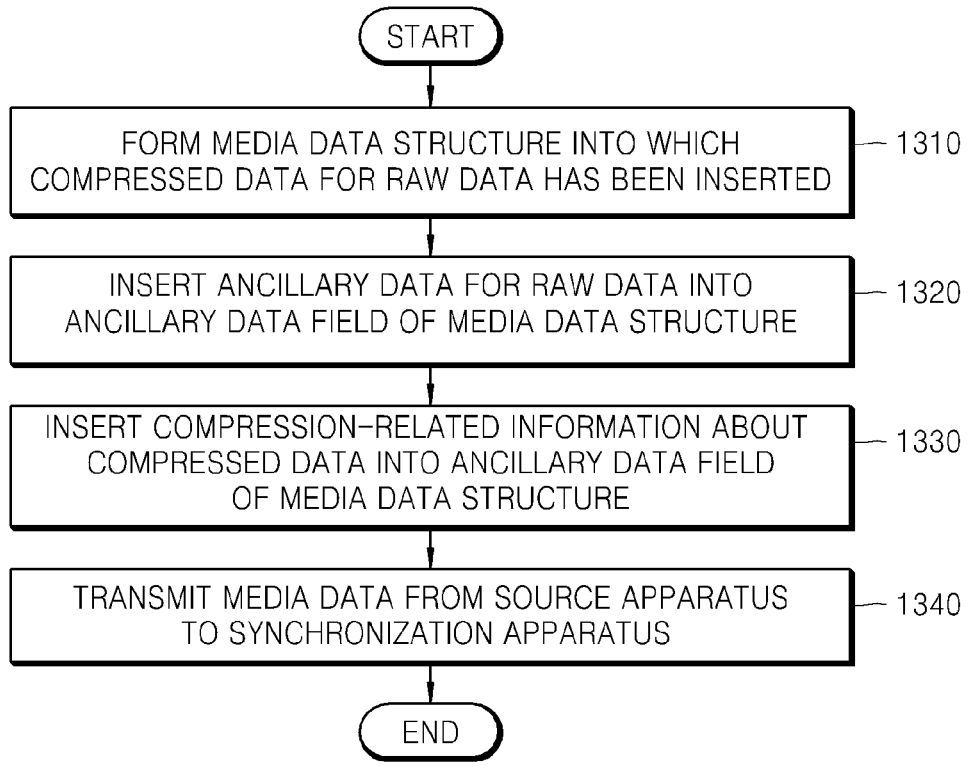
FIG. 13 is a flowchart of a method of transmitting media data from a source apparatus to a synchronization apparatus by using a digital data interface of the synchronization apparatus, according to an exemplary embodiment of the present invention.

FIG. 13 is a flowchart of a method of transmitting media data from a synchronization apparatus to a source apparatus by using a digital data interface of the synchronization apparatus, according to an exemplary embodiment of the present invention.

In operation 1310, a media data structure into which compressed data for raw data has been inserted is formed. The media data structure may be a data structure that can be recognized and transceived by the digital data interface.

In operation 1320, ancillary data for the raw data is inserted into an ancillary data field of the media data structure. For example, if the media data structure is a digital video stream, the ancillary data may be inserted into a VANC data space or an HANC data space. In this case, the VANC data space may be inserted into a VBI field of the digital video stream, or the HANC data space may be inserted into a digital line blinking interval field of the digital video stream.

In operation 1330, the compression-related information about the compressed data is inserted into the ancillary data field of the media data structure. The compression-related information as well as the ancillary data may be inserted into the VANC data space or the HANC data space.

In operation 1340, the media data is transmitted from the source apparatus to the synchronization apparatus via the digital data interface.

In the method of transmitting the media data from the source apparatus to the synchronization apparatus via the digital data interface of the synchronization apparatus, compression-related information required to display compressed data may be inserted into media data having a data structure capable of being transmitted via the digital data interface. Thus, no special channels may be required to receive the compression-related information, and ancillary data required to restore and display 3D video images as well as the compressed data may be transmitted even when using the existing system.

FIG. 14 is a flowchart of a method of receiving display-related information by using a digital data interface of a synchronization apparatus, according to an exemplary embodiment of the present invention.

In operation 1410, the display-related information received from the synchronization apparatus via the digital data interface is parsed. The display-related information may have a data structure capable of being transceived via the digital data interface.

In operation 1420, information about a playback capability of the synchronization apparatus is extracted from the parsed display-related information. In operation 1430, information about a compressed data playback capability of the synchronization apparatus is extracted from the information about the playback capability of the synchronization apparatus.

The source apparatus may determine compressed data to be transmitted to the synchronization apparatus by using the information about the playback capability of the synchronization apparatus, the information about the compressed data playback capability of the synchronization apparatus, or both the information about the playback capability of the synchronization apparatus and the information about the compressed data playback capability of the synchronization apparatus. Therefore, in communication environments where large-capacity data, such as high-resolution video images, high-quality video images, or 3D video images, or compressed data obtained by compressing the large-capacity data are to be transmitted, in the method of receiving the display-related information via the digital data interface, the source apparatus may selects and transmits data capable of being played back by the synchronization apparatus, thereby improving communication efficiency.

Exemplary embodiments of the present invention may be embodied as computer programs and implemented in general-use digital computers that execute the programs using a tangible computer readable recording medium. Examples of the computer readable recording medium include magnetic storage media (e.g., ROM, floppy disks, hard disks, etc.), optical media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims. Additionally, eexpressions such as "at least one of," when preceding a list of elements, modify the entire list of elements and do not modify each element of the list.

What is claimed is:

1. A method of receiving media data via a digital data interface of a synchronization apparatus from a source apparatus, the method comprising:

generating display-related information about a playback capability of the synchronization apparatus in a data structure transceivable via the digital data interface;

inserting information about a compressed data playback capability of the synchronization apparatus into the display-related information;

transmitting the display-related information from the synchronization apparatus to the source apparatus via the digital data interface of the synchronization apparatus;

receiving the media data from the source apparatus, wherein the source apparatus selects the media data based on the display-related information and generates the media data in a data structure transceivable via the digital data interface;

extracting compression-related information about compressed data obtained by compressing raw data, from an ancillary data field of the received media data, wherein ancillary data for the raw data has been inserted into the ancillary data field;

extracting the compressed data from the received media data; and decoding the compressed data, by using the compression-related information.

2. The method of claim 1, further comprising:

extracting the ancillary data from the ancillary data field; and playing back the raw data restored by decoding the compressed data, by using at least one of the ancillary data and the compression-related information.

3. The method of claim 1, wherein the compression-related information comprises at least one of information about whether the compressed data is in the media data, information about a bitrate of the compressed data, information about a type of a data stream of the compressed data, information about a compression method of the compressed data, information about a resolution of the compressed data, and information about three-dimensional (3D) image compressed data.

4. The method of claim 3, wherein the information about the type of the data stream of the compressed data comprises information about whether the compressed data is in a form of an elementary stream (ES) or a transport stream (TS).

5. The method of claim 4, wherein the information about the type of the data stream of the compressed data comprises information about a file format or container of the compressed data.

6. The method of claim 3, wherein the information about the compression method of the compressed data represents a standard or profile followed by the compressed data.

7. The method of claim 6, wherein the profile followed by the compressed data comprises at least one of a H.264 baseline profile, a H.264 Main Profile, a H.264 High Profile, an MPEG4 Simple Profile, and an MPEG4 Advanced Simple Profile.

8. The method of claim 3, wherein the information about the 3D image compressed data comprises at least one of information about whether the compressed data is 3D-image compressed data, information about whether depth image data exists, and information about whether camera parameter information exists, wherein the 3D-image compressed data is obtained by compressing 3D image data.

9. The method of claim 1, wherein the extracting of the compression-related information comprises extracting the compression-related information from a compression-related field or a reserved field of an ancillary data frame inserted into the data structure of the media data.

10. The method of claim 1, wherein the extracting of the compression-related information comprises extracting the compression-related information from an ancillary data frame different from an ancillary data frame including the ancillary data.

11. The method of claim 1, wherein the ancillary data field is at least one of a vertical blanking interval (VBI) field and a horizontal blanking interval (HBI) field of the data structure of the media data.

12. The method of claim 1, wherein the extracting of the compressed data comprises extracting the compressed data from at least one of a vertical blanking interval (VBI) field, a horizontal blanking interval (HBI) field, and an active video space of the data structure of the media data.

13. The method of claim 11, wherein according to a data transmission speed, data pieces for respective color components of the compressed data are transmitted via a single data line or via data lines for the respective color components.

14. The method of claim 1, wherein the ancillary data comprises at least one of Auxiliary Video Information (AVI), Serial Presence Detect (SPD) information, audio information, Moving Picture Experts Group (MPEG) information, and general control information.

15. The method of claim 1, wherein the information about the compressed data playback capability of the synchronization apparatus comprises at least one of information about a bitrate of compressed data capable of being played back by the synchronization apparatus, information about whether the synchronization apparatus is able to play back compressed data, information about a type of data stream of the compressed data capable of being played back by the synchronization apparatus, information about a compression method of the compressed data capable of being played back by the synchronization apparatus, information about a resolution of the compressed data capable of being played back by the synchronization apparatus, and information about 3D image compressed data that can be played back by the synchronization apparatus.

16. The method of claim 15, wherein the information about the type of the data stream of the compressed data capable of being played back by the synchronization apparatus comprises information about whether the compressed data is in a form of an elementary stream (ES) or a transport stream (TS).

17. The method of claim 16, wherein the information about the type of the data stream of the compressed data capable of being played back by the synchronization apparatus comprises information about a file format or container of the compressed data capable of being played back by the synchronization apparatus.

18. The method of claim 15, wherein the information about the compression method of the compressed data capable of being played back by the synchronization apparatus represents a standard or profile followed by the compressed data capable of being played back by the synchronization apparatus.

19. The method of claim 15, wherein the information about the 3D image compressed data capable of being played back by the synchronization apparatus comprises at least one of information about whether the synchronization apparatus is able to use the 3D-image compressed data, information about whether the synchronization apparatus is able to use depth image data, and information about whether the synchronization apparatus is able to use camera parameter information, wherein the 3D-image compressed data is obtained by compressing 3D image data.

20. The method of claim 1, wherein the inserting of the information about the compressed data playback capability of the synchronization apparatus comprises inserting the information about the compressed data playback capability of the synchronization apparatus into a reserved bit field of the display-related information or into new display-related information.

21. The method of claim 1, wherein the display-related information comprises at least one of information about a manufacturer of the synchronization apparatus, information about a product type of the synchronization apparatus, information about a model of the synchronization apparatus, information about a version of the synchronization apparatus, timing information of the synchronization apparatus, information about resolutions supported by the synchronization apparatus, information about a color format of the synchronization apparatus, information about pixels of the synchronization apparatus, and information about audio supported by the synchronization apparatus.

22. The method of claim 1, wherein the digital data interface comprises a High-Definition Multimedia Interface (HDMI).

23. The method of claim 1, wherein the synchronization apparatus comprises a High Definition Television (HDTV).

24. The method of claim 1, wherein the media data is received from a source apparatus comprising a set-top box.

25. A method of transmitting media data from a source apparatus to a synchronization apparatus via a digital data interface of the synchronization apparatus, the method comprising:

receiving display-related information in a data structure transceivable via the digital data interface from the synchronization apparatus;

extracting information about a playback capability of the synchronization apparatus from the received display-related information;

extracting information about a compressed data playback capability of the synchronization apparatus from the information about the playback capability of the synchronization apparatus;

compressing raw data based on the extracted information about the compressed data playback capability of the synchronization apparatus;

forming a media data structure, in a data structure transceivable via the digital data interface, comprising compressed data obtained by compressing raw data;

inserting ancillary data for the raw data into an ancillary data field included in the media data structure;

inserting compression-related information about the compressed data into the ancillary data field of the media data structure; and transmitting the media data from the source apparatus to the synchronization apparatus via the digital data interface.

26. The method of claim 25, further wherein the compressing of the raw data comprises determining compressed data to be transmitted to the synchronization apparatus by using at least one of the information about the playback capability of the synchronization apparatus and the information about the compressed data playback capability of the synchronization apparatus.

27. An apparatus for receiving media data via a digital data interface of a synchronization apparatus from a source apparatus, the apparatus comprising:
   a display-related information generation unit which generates the display-related information about a playback capability of the synchronization apparatus in a data structure transceivable via the digital data interface;
   a compressed data playback capability information insertion unit which inserts information about a compressed data playback capability of the synchronization apparatus into the display-related information;
   a display-related information transmission unit which transmits the display-related information from the synchronization apparatus to the source apparatus via the digital data interface;
   a media data parsing unit which receives and parses the media data from the source apparatus via the digital data interface, wherein the source apparatus selects the media data based on the display-related information and generates the media data in a data structure transceivable via the digital data interface;
   a compression-related information extraction unit which extracts compression-related information about compressed data obtained by compressing raw data, from an ancillary data field of the parsed media data, wherein ancillary data for the raw data has been inserted into the ancillary data field;
   a compressed data extraction unit which extracts the compressed data from the parsed media data; and
   a decoding unit which decodes the compressed data by using the compression-related information.

28. The apparatus of claim 27, further comprising:
   an ancillary data extraction unit which extracts the ancillary data from the ancillary data field; and
   a playback unit which plays back the raw data restored by decoding the compressed data, by using at least one of the ancillary data and the compression-related information.

29. An apparatus for transmitting media data from a source apparatus to a synchronization apparatus via a digital data interface of the synchronization apparatus, the apparatus comprising:
   a display-related information receiving unit which receives display-related information in a data structure transceivable via the digital data interface from the synchronization apparatus;
   a display-related information extracting unit which extracts information about a playback capability of the synchronization apparatus from the received display-related information, and extracts information about a compressed data playback capability of the synchronization apparatus from the information about the playback capability of the synchronization apparatus;
   a compression unit which compresses raw data based on the extracted information about the compressed data playback capability of the synchronization apparatus;
   a media data structure formation unit which forms a media data structure, in a data structure transceivable via the digital data interface, into which compressed data obtained by compressing raw data has been inserted;
   an ancillary data insertion unit which inserts ancillary data for the raw data into an ancillary data field included in the media data structure; and
   a compression-related information insertion unit which inserts compression-related information about the compressed data into the ancillary data field of the media data structure; and
   a media data transmission unit which transmits the media data from the source apparatus to the synchronization apparatus via the digital data interface.

30. The apparatus of claim 29, further comprising a media data determination and transmission unit which determines and transmits compressed data to be transmitted to the synchronization apparatus by using at least one of the information about the playback capability of the synchronization apparatus and the information about the compressed data playback capability of the synchronization apparatus.

31. A non-transitory computer-readable recording medium having recorded thereon a program for executing the method of claim 1.

32. A non-transitory computer-readable recording medium having recorded thereon a program for executing the method of claim 25.

33. A system for transmitting display-related information, the system comprising:
   a synchronization apparatus connected to a source apparatus via a digital data interface, the synchronization apparatus comprising:
   a display-related information generation unit which generates the display-related information into which information about a playback capability of the synchronization apparatus has been inserted, and
   a display-related information transmission unit which transmits the display-related information to the source apparatus via the digital data interface, and
   a source apparatus comprising:
   a display-related information parsing unit which parses the display-related information transmitted from the synchronization apparatus, and
   a media data determination unit which determines compressed data to be transmitted to the synchronization unit via the digital data interface, based on the display-related information.

* * * * *